W. HEGGIE.
TIRE FOR MOTOR CARS AND OTHER VEHICLES.
APPLICATION FILED SEPT. 29, 1919.

1,365,243.

Patented Jan. 11, 1921.

INVENTOR:
William Heggie
By Wm Wallace White
ATTY.

W. HEGGIE.
TIRE FOR MOTOR CARS AND OTHER VEHICLES.
APPLICATION FILED SEPT. 29, 1919.

1,365,243. Patented Jan. 11, 1921.

INVENTOR:
William Heggie
BY Wm Wallace White

UNITED STATES PATENT OFFICE.

WILLIAM HEGGIE, OF DUBLIN, IRELAND.

TIRE FOR MOTOR-CARS AND OTHER VEHICLES.

1,365,243.  Specification of Letters Patent.  Patented Jan. 11, 1921.

Application filed September 29, 1919. Serial No. 327,248.

*To all whom it may concern:*

Be it known that I, WILLIAM HEGGIE, of 11 George's Quay, Dublin, Ireland, (master painter) subject of the King of Great Britain and Ireland, have invented certain new and useful Improvements in Tires for Motor-Cars and other Vehicles, of which the following is a specification.

This invention relates to tires of wheels of vehicles of the type wherein the rim of the wheel or wheel proper is suspended from an inextensile tire with a tread of rubber or similar material. The object of this invention is to get resiliency mainly from that portion of the tire which is not for the time being nearest the road.

A tire made in accordance with this invention is characterized in that the tire comprises semi tires constituting a double treaded tire with a space between them. From each of the said semi tires the wheel proper is suspended by a web or webs of canvas or other suitable material and each semi tire is provided with an inextensile ring or rings resistant to deformation which is or are preferably embedded in the tread in any known manner. Each tread preferably consists of one or more rings or bands of steel or other material embedded in rubber, rubber and canvas, or other material disposed concentrically with the rim. These rings serve the double purpose of suspending the rim by means of the web and of strengthening the tread. One form of tire made in accordance with this invention consists of a pair of similar interchangeable circular semi tires on each wheel, each pair of semi tires constituting a double treaded tire with a space between the treads. The tire is or may be secured to the rim ordinarily used for pneumatic tires by a metal band passing around the wheel and tire in the space between the treads. This security band is preferably made in two semi-circular halves which may be fastened together and tightened by means of straining screws or in any other suitable manner. The portion of each semi tire which fits into the rim has a beading which is gripped between the metal security band and the rim.

Each semi tire is reinforced by one or more steel rings embedded in the fabric and concentric with the tire. These rings are for the purpose of strengthening the tire and imparting resiliency to it. When the two semi tires are fixed on the rim they are mutually splayed so that the complete tire is broader at the tread than the rim, and the parts tend to be deflected apart where they touch the ground thus widening the space between them and allowing the wheel to sink toward the ground. The rim is prevented from actual contact with the ground by the elastic support which it receives from the upper portion of the tire from which it is virtually suspended and which gives the required resiliency.

Referring to the drawings filed herewith:

1 indicates the felly of the wheel, 2 the rim of the wheel, 3 vulcanized rubber or other suitable filling for reinforcing the beads, 4 an internal metal security band, 5 fabric connecting the tread with the rim, 6 a filling of vulcanized rubber or suitable material, 7 steel inextensile rings (3 are shown in each semi-tire, but I do not confine myself to a definite number of rings), 8 the rubber treads.

Figure 1:
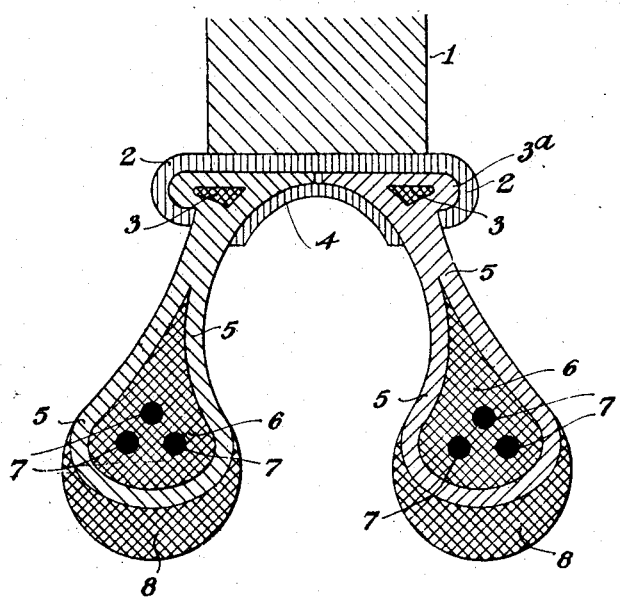
Figure 1 is a section of one form of tire made in accordance with this invention.

In Fig. 1 the inextensile rings 7 and filling 6, form two inextensile separate and similar elements which are connected to the beads 3ª by fabric 5, each tread being covered with rubber 8.

Figure 2:
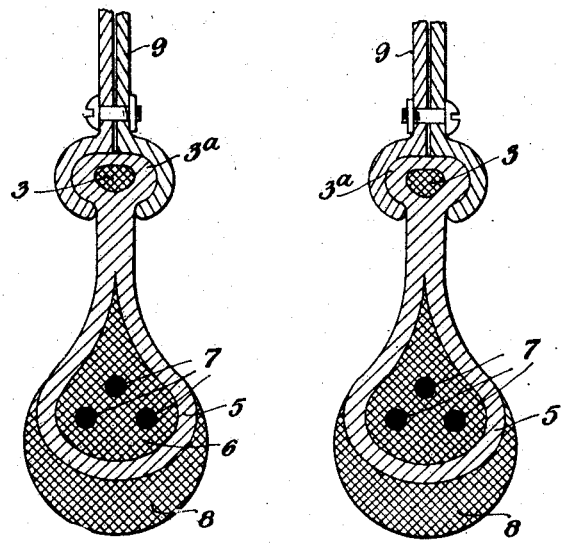
Fig. 2 is a section showing two tires each with single treads mounted on metal disk wheels placed coaxially.

In Fig. 2, two single inextensile elements each formed of steel rings 7 covered with vulcanized rubber or other suitable material 6, fabric 5 and rubber tread 8 are mounted on metal disk wheels 9 placed coaxially. The fabric 5 connects the inextensile elements to the beads 3ª.

Figure 3:
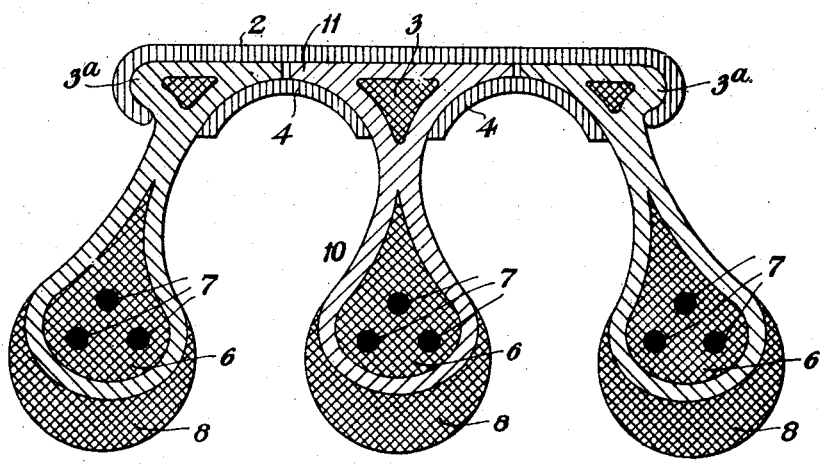
Fig. 3 is a section showing two semi tires and one single tire fitted to a rim with two security bands.

In Fig. 3, a third tread 10 having an inextensile element formed of steel rings 7 covered with rubber or other suitable material 6, and fabric 5, and provided with a rubber tread 8 connected to a flange 11, is placed between two separate and similar inextensile elements, each formed with rings 7 covered with material 6 and fabric 5 and provided with a rubber tread 8. The beads 3ª and flange 11 are strengthened with vulcanized rubber 3 and held to the rim 2 by security bands 4, 4.

It is within my invention to dispose the two semi-tires constituting the double treaded tire upon a pair of coaxial wheels in such a manner that each tends to splay outward from the other. It is also within my invention to dispose between the two semi-tires comprising the double treaded tire or wheel, a third tread of a similar character.

What I claim and desire to secure by Letters Patent is:—

1. A tire for wheels of vehicles comprising a plurality of inextensile elements and each element being formed of not less than one steel ring embedded in material, beads connecting said elements to the rim of a wheel and webs between the inextensile elements and the beads, said elements being capable of spreading apart when in contact with the ground.

2. A tire for wheels of vehicles comprising two inextensile elements each similar and separate, means for connecting each element to a rim of a wheel, said means comprising a bead and a web between the said element and bead and a security band disposed between the elements, said elements being capable of spreading when in contact with the ground.

In testimony whereof I have signed my name to this specification.

WILLIAM HEGGIE.

Witnesses:
W. G. JOHNSTONE,
GEO. VAN DYNE.